US011256606B2

(12) United States Patent
Wunderlich et al.

(10) Patent No.: US 11,256,606 B2
(45) Date of Patent: Feb. 22, 2022

(54) DECLARATIVE SIGNUP FOR EPHEMERAL ORGANIZATION STRUCTURES IN A MULTITENANT ENVIRONMENT

(71) Applicant: salesforce.com, inc., San Francisco, CA (US)

(72) Inventors: James Bock Wunderlich, Burlingame, CA (US); Michael Dwayne Miller, Boulder, CO (US); Michael Christopher Olson, Oconomowoc, WI (US); Vamshidhar Rao Gandham, Union City, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 15/716,343

(22) Filed: Sep. 26, 2017

(65) Prior Publication Data

US 2018/0129587 A1    May 10, 2018

Related U.S. Application Data

(60) Provisional application No. 62/417,953, filed on Nov. 4, 2016.

(51) Int. Cl.
  *G06F 11/36*   (2006.01)
  *G06F 21/62*   (2013.01)
    (Continued)

(52) U.S. Cl.
  CPC ...... *G06F 11/3664* (2013.01); *G06F 11/3688* (2013.01); *G06F 21/62* (2013.01);
    (Continued)

(58) Field of Classification Search
  CPC ....... G06F 8/00–78; G06F 11/36–3696; G06F 11/3664; G06F 11/3688; G06F 21/62;
    (Continued)

(56) References Cited

U.S. PATENT DOCUMENTS

| 5,577,188 A | 11/1996 | Zhu |
| 5,608,872 A | 3/1997 | Schwartz et al. |

(Continued)

OTHER PUBLICATIONS

Tsai, Wei-Tek, et al. "Towards a scalable and robust multi-tenancy SaaS." Proceedings of the Second Asia-Pacific Symposium on Internetware. 2010. (Year: 2010).*

(Continued)

*Primary Examiner* — Doon Y Chow
*Assistant Examiner* — Joanne G Macasiano
(74) *Attorney, Agent, or Firm* — Kwan & Olynick LLP

(57) ABSTRACT

Techniques and architectures for creating scratch organizations in a multitenant environment. A scratch organization defined by metadata corresponding to a subject organization is generated. The metadata defines at least a set of privileges for the subject organization to be replicated in the scratch organization. Test data is loaded from a test source that is not the subject organization. Changes to the subject organization are not applied to the scratch organization after creation of the scratch organization and changes to the scratch organization are not applied to the subject organization. One or more test operations are performed on the scratch organization using the loaded test data. The scratch organization is destroyed after the one or more test operations have been performed.

14 Claims, 8 Drawing Sheets

(51) Int. Cl.
  *H04L 12/26* (2006.01)
  *H04L 29/08* (2006.01)
  *H04L 43/50* (2022.01)
  *H04L 67/1097* (2022.01)
  *H04L 67/14* (2022.01)
  *H04L 67/52* (2022.01)

(52) U.S. Cl.
  CPC .......... *H04L 43/50* (2013.01); *H04L 67/1097* (2013.01); *H04L 67/14* (2013.01); *H04L 67/18* (2013.01)

(58) Field of Classification Search
  CPC ..... H04L 43/50; H04L 67/1097; H04L 67/14; H04L 67/18
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,660,423 B2 | 2/2010 | Perlman |
| 8,078,807 B2 | 12/2011 | Saha et al. |
| 8,438,640 B1 * | 5/2013 | Vaish .................... G06F 8/658 726/22 |
| 9,582,524 B1 | 2/2017 | Murali et al. |
| 9,594,904 B1 | 3/2017 | Jain et al. |
| 9,596,291 B1 | 3/2017 | Basva |
| 10,089,676 B1 | 10/2018 | Gupta et al. |
| 10,162,528 B2 | 12/2018 | Sancheti et al. |
| 10,387,291 B2 | 8/2019 | Wunderlich et al. |
| 10,454,902 B2 | 10/2019 | Angelo et al. |
| 10,616,127 B1 | 4/2020 | Suit |
| 10,871,950 B2 | 12/2020 | Smet |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0131084 A1 | 7/2003 | Pizzorni et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0212986 A1* | 11/2003 | Nelin .................. G06F 11/3664 717/124 |
| 2003/0217258 A1 | 11/2003 | Bade |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0195651 A1 | 8/2008 | Rachmiel et al. |

(56) References Cited

U.S. PATENT DOCUMENTS

| | | |
|---|---|---|
| 2009/0177744 A1 | 7/2009 | Marlow et al. |
| 2009/0320109 A1 | 12/2009 | Salada et al. |
| 2011/0078213 A1* | 3/2011 | Bezar .................... G06Q 10/10 707/805 |
| 2011/0083122 A1* | 4/2011 | Chen .................. G06F 11/3668 717/124 |
| 2011/0225217 A1* | 9/2011 | Plax .................... G06F 17/3056 707/825 |
| 2011/0289356 A1* | 11/2011 | Hossain ............. G06F 11/3672 714/38.1 |
| 2012/0054754 A1* | 3/2012 | Teichmann ........... H04L 41/082 718/102 |
| 2012/0254842 A1 | 10/2012 | Henderson |
| 2013/0110939 A1 | 5/2013 | Yang et al. |
| 2013/0117289 A1 | 5/2013 | Fischer et al. |
| 2013/0139003 A1* | 5/2013 | Patwardhan ........ G06F 11/3684 714/32 |
| 2013/0173669 A1 | 7/2013 | Tang et al. |
| 2013/0262626 A1 | 10/2013 | Bozek et al. |
| 2013/0318498 A1* | 11/2013 | Mittal .................... G06F 11/366 717/124 |
| 2014/0331310 A1 | 11/2014 | Salada et al. |
| 2014/0337467 A1 | 11/2014 | Pech et al. |
| 2015/0052523 A1 | 2/2015 | Raghu |
| 2015/0186645 A1 | 7/2015 | Aziz et al. |
| 2015/0244596 A1 | 8/2015 | Abuelsaad et al. |
| 2015/0295779 A1 | 10/2015 | Ching et al. |
| 2015/0378716 A1 | 12/2015 | Singh et al. |
| 2016/0070555 A1* | 3/2016 | Xiong ................. G06F 11/3668 717/171 |
| 2016/0117388 A1 | 4/2016 | Fan |
| 2016/0132805 A1 | 5/2016 | Delacourt et al. |
| 2016/0259804 A1 | 9/2016 | Subramaniam et al. |
| 2016/0381092 A1 | 12/2016 | Dash et al. |
| 2017/0075791 A1 | 3/2017 | Ramakrishna et al. |
| 2017/0075794 A1 | 3/2017 | Ramakrishna et al. |
| 2017/0075919 A1 | 3/2017 | Bose et al. |
| 2017/0344353 A1 | 11/2017 | Roy-Faderman et al. |
| 2018/0027006 A1 | 1/2018 | Zimmermann et al. |
| 2018/0067844 A1* | 3/2018 | Conti .................. G06F 11/3672 |
| 2018/0089320 A1 | 3/2018 | Hanson et al. |
| 2018/0181383 A1 | 6/2018 | Jagannath |
| 2018/0246921 A1 | 8/2018 | Henvy et al. |
| 2019/0235895 A1 | 8/2019 | Ovesea et al. |
| 2020/0042427 A1 | 2/2020 | Bastianelli et al. |
| 2020/0042724 A1 | 2/2020 | Bastianelli et al. |

OTHER PUBLICATIONS

Bezemer, Cor-Paul, et al. "Enabling multi-tenancy: An industrial experience report." 2010 IEEE International Conference on Software Maintenance. IEEE, 2010. (Year: 2010).*

Ernst ("Version control concepts and best practices", 8 pages, Jun. 20, 2016) (Year: 2016).

Non-Final Office Action for U.S. Appl. No. 15/466,752 dated Dec. 20, 2018, 11 pages.

Non-Final Office Action for U.S. Appl. No. 15/716,349 dated Mar. 4, 2019, 17 pages.

Final Office Action for U.S. Appl. No. 15/466,752 dated Jun. 7, 2019, 15 pages.

Heroku Dev Center ("CLI Usage", Aug. 2, 2016, 3 pages) (Year: 2016).

Notice of Allowance for U.S. Appl. No. 15/727,273 dated May 3, 2019, 9 pages.

Final Office Action for U.S. Appl. No. 15/466,752 dated Feb. 27, 2020, 14 pages.

Non-Final Office Action for U.S. Appl. No. 15/466,752 dated Oct. 1, 2019, 9 pages.

Notice of Allowance for U.S. Appl. No. 15/716,349 dated Aug. 28, 2019, 8 pages.

Non-Final Office Action for U.S. Appl. No. 16/050,671 dated Jul. 16, 2020, 31 pages.

Non-Final Office Action for U.S. Appl. No. 16/177,337 dated Jul. 16, 2020, 31 pages.

Non-Final Office Action for U.S. Appl. No. 16/460,939 dated Aug. 10, 2020, 16 pages.

Non-Final Office Action for U.S. Appl. No. 16/701,001 dated Jul. 2, 2020, 13 pages.

Non-Final Office Action for U.S. Appl. No. 15/466,752 dated Oct. 8, 2020, 16 pages.

Notice of Allowance for U.S. Appl. No. 16/701,001 dated Nov. 20. 2020, 8 pages.

Notice of Allowance for U.S. Appl. No. 16/050,671 dated Jan. 15, 2021, 14 pages.

Notice of Allowance for U.S. Appl. No. 16/177,337 dated Jan. 19, 2021, 15 pages.

Final Office Action for U.S. Appl. No. 15/466,752 dated Mar. 19, 2021, 17 pages.

Notice of Allowance for U.S. Appl. No. 16/460,939 dated Feb. 18, 2021, 9 pages.

Non-Final Office Action for U.S. Appl. No. 15/466,752 dated Jul. 15, 2021, 13 pages.

* cited by examiner

DECLARATIVE SIGNUP FOR EPHEMERAL ORGANIZATION STRUCTURES IN A MULTITENANT ENVIRONMENT

CLAIM OF PRIORITY

This application claims the benefit of U.S. Provisional Patent Application 62/417,953 entitled "DESTRUCTIVE SCRATCH ORGS," by James Bock Wunderlich, George Murnock, Josh Kaplan, Michael Dwayne Miller and Mark Wilding, filed Nov. 4, 2016, the entire contents of which are incorporated herein by reference.

RELATED APPLICATIONS

The present U.S. patent application is related to the following U.S. patent application filed concurrently herewith and incorporated by reference:

1) CREATION AND UTILIZATION OF EPHEMERAL ORGANIZATION STRUCTURES IN A MULTITENANT ENVIRONMENT, by James Bock Wunderlich and Michael Dwayne Miller Ser. No. 15/716,349.

TECHNICAL FIELD

Embodiments relate to techniques for managing ephemeral organizations in a multitenant environment. More particularly, techniques for efficiently creating and utilizing ephemeral organizations within a multitenant environment.

BACKGROUND

In normal operating conditions, organizations (or "orgs") within a multitenant environment are intended to have a long lifespan and can operate on constantly changing data. Creation of these orgs is typically a relatively slow and complex process involving determining and implementing the scope and shape of the org.

During development phases, test environments (or test orgs) are needed to determine if development packages will integrate with an existing production environment without issues. However, using traditional creation techniques result in a long and complex development time frame because multiple org creation operations are necessary to provide through testing and development.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
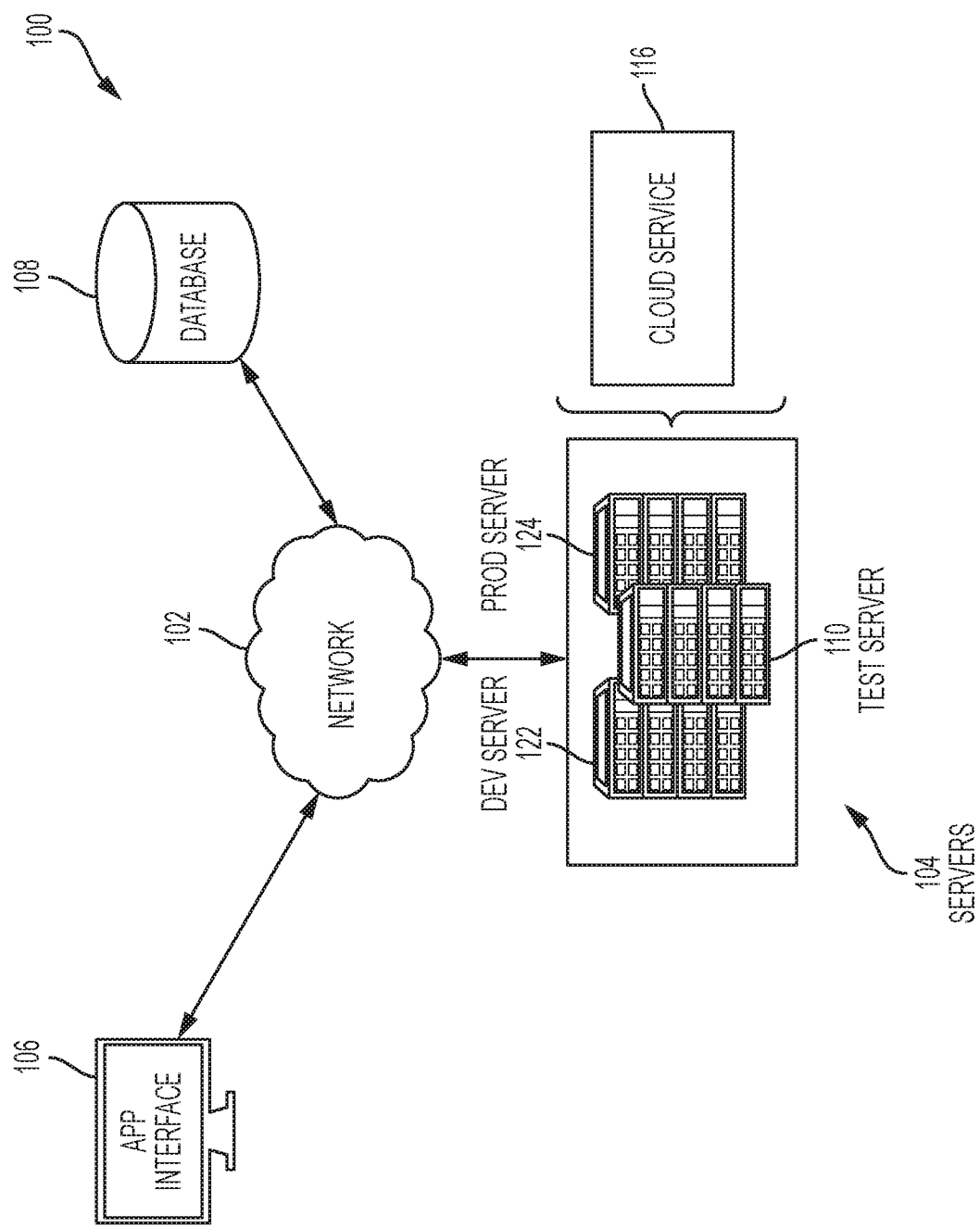
FIG. 1 illustrates an embodiment of a multitenant system that can provide execute ephemeral (or scratch) test organizations.

In the following description, numerous specific details are set forth. However, embodiments of the invention may be practiced without these specific details. In other instances, well-known structures and techniques have not been shown in detail in order not to obscure the understanding of this description.

Within a multitenant environment, a tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Each tenant can include one or more organizations (orgs) that have varying scope within the host tenant structure. Multi-tenancy contrasts with multi-instance architectures, where separate software instances operate on behalf of different tenants.

As discussed above, org creation is a relatively long and expensive process. In the case of force.com, for example, provisioning an org is slow and the orgs are never deleted. If orgs are expensive to create and delete, great effort is expended to reuse them. Thus, traditional practice is to clear out data and reuse the org during testing and development. This is yet another very expensive operation and creates undue demand on production/sandbox resources.

Described herein is a new org type. This new org type can be referred to as a "scratch" org, which is a temporary (or ephemeral) tenant within the multitenant environment. These scratch orgs are used only during development and testing. In various embodiments, scratch orgs are short-lived orgs that are destroyed when the development/test process has completed. Thus, instead of spending using resources to clean metadata and other cleaning operations, the scratch org is used for testing and then deleted when testing is completed. The scratch orgs are ephemeral tenants of a multitenant environment that exist just long enough to perform a set of development tasks.

In one embodiment, scratch orgs are created with reduced provisioning and overhead to reduce resource consumption. In one embodiment, scratch orgs run in an isolated fashion and do not participate in all services. In some embodiments, scratch orgs may have a more complete life cycle as compared with other organization types. Life cycle stages include creation (for example, organization signup), use (for example, logging in and running tests), and deletion (death).

In one embodiment, scratch orgs are created in a sandbox environment to isolate them from production environments and servers. In other embodiments, the scratch orgs can be created behind cloud-based virtual machines to provide elastic scratch org capacity.

Using standard techniques, creation of a new org does not allow the addition of various org features at org creation time. The additional features are generally added in a separate provisioning step. However, using some of the techniques described herein, a set of features (e.g., a combination of permissions and/or preferences) can be declared and provisioned during the setup process. This technique can be utilized to provide scratch orgs with selected characteristics for testing.

FIG. 1 illustrates an embodiment of a multitenant system that can provide execute ephemeral (or scratch) test organizations. In one embodiment, system environment 100 includes application interface 106, network 102 (e.g., LAN, WAN, WWW), database 108 (e.g., Oracle, DB2, MySQL, PostgreSQL, SQLite, SQL server, Sybase, etc.), and servers 104 (e.g., LAMP, Oracle, Microsoft). In one embodiment, servers 104 include a test server 110 (e.g., Selenium, Capybara, Open STA), development server 122, and production server 124.

Although illustrated as separate machines, one or more of servers 104 may be implemented as a "virtual server" or partitioned execution space on the same physical machine. Network 102 can include devices interconnected in ways known the art to effect communications between the various components (e.g., routers, hubs, servers, gateways, network bridges, modems, wireless access points, networking cables, line drivers, switches, and repeaters, and also include hybrid network devices such as multilayer switches, protocol converters, bridge routers, proxy servers, firewalls, network address translators, multiplexers, network interface controllers, wireless network interface controllers, ISDN terminal adapters, WAN, LAN, WWW, etc.)

In one embodiment servers 104 execute environments on test server 110, development server 122, and production server 124. Servers 104 may share resources and data to implement cloud service 116. In cases where environments are expensive to create and delete, great effort is expended to reuse them. This is due to the fact that provisioning new environments can be a slow process, and it can take significant time to delete environments.

Embodiments of a novel system and process are disclosed to associate users with one or more ephemeral organizations ("scratch orgs") can be efficiently created using metadata to determine the shape of the crated organizations. As used herein an organization shape refers to the configuration of the organization including, for example, permissions, resource allocations, licensing authorizations/restrictions, etc. In one embodiment, a JavaScript Object Notation (JSON) configuration file can be utilized.

In a multi-tenant model, each tenant is assigned a unique configuration and options that create an "organization shape." Aspects of the shape are determined by options under control of customers, but other aspects are derived from flags and licenses only the environment provider (e.g., Salesforce.com) has permission to configure. This may be for developing applications that are to be distributed to different tenants, which are configured to specifically account for different organization shapes. For example, if a tenant has multi-currency turned on, the data available to an application is different than for a tenant with multi-currency turned off. Some implementations (e.g., Apex) generate errors if not coded to properly process these variations.

Because the logic adjusts to different organization shapes and the logic is tested against various organization shapes. Current techniques involve creation of multiple "testing" organizations, which are complicated to configure and create, and a limited and poorly-scaled resource.

As described herein, ephemeral organizations are created and operated differently than conventional organizations. Standard organizations are created provisioned from licensing/configuration systems that enable multi-tenancy operation. Ephemeral organizations have some features in common with conventional organizations, but are more flexible and include features not available to conventional organizations. Thus, an ephemeral organization cannot be converted into a conventional organization or vice versa.

In one embodiment, ephemeral organizations may be created and provisioned by cloning configuration data of a conventional organization. However, no link is created between the two organizations. Once created, changes to the ephemeral organization are not reflected back into the conventional organization. Similarly, changes to the conventional organization are not carried through to the corresponding ephemeral organization(s).

The ephemeral scratch orgs are created without user data (e.g., the orgs are empty) and at conclusion of a test procedure the scratch orgs are discarded. Data used for testing is synthetic data that is loaded from a data source (e.g., test data file) after creation of the scratch org prior to running the test procedures. This allows testing conditions to be consistent and repeatable, which is difficult to do when organizations are maintained and cleaned for testing.

In some embodiments, ephemeral organizations may utilize scripts or an ephemeral organization launcher to load (read in and configure) synthetic data. Ephemeral organizations may not be configured to enable loading of customer data (i.e. sandbox) nor to retain data created directly in the organization.

By creating the scratch org from the same configuration file each time with no data included a consistent testing environment can be provided. In one embodiment, a data loader is utilized to load synthetic data into the empty scratch org for testing. In one embodiment, all definitions are external to the scratch org so that testing and processing is repeatable. Loading the same data each time provides testing consistency.

In one embodiment, once the testing has been completed the scratch org is discarded. There is no data cleaning or restoration. Further, there is no disaster recovery or failover mechanisms are necessary. In contrast to creation of ephemeral organizations as described herein, traditional cloning or sandboxing techniques can result in a changing organization shape because the cloning process replicates changes to the base organization.

Developed logic may be tested in the scratch orgs before being released to production environments. Additional organizations with different organizations shapes may be added to testing suites based on learned results. Organization shape changing is typically not allowed in production and sandbox environments.

When a test is executed, results of the test are collected. Example test results from operating ephemeral organizations include elapsed test time, processor test time, database utilization time, heap space, count of database round trips, limits, and warning messages. Other and/or different test parameters can also be utilized.

In one embodiment, the scratch org can be considered a unit of virtualization. In these embodiments, the scratch org can run on any suitable computing platform (e.g., production environment, remote cloud service, local computers, mobile devices). In one embodiment, the location of the scratch org is transparent to the testing entity and is not tied to any device or location.

In one embodiment, ephemeral organizations may be created with a global namespace if the user is either developing a managed package or unmanaged metadata. In one embodiment, ephemeral organizations are created with a reference to an environment hub so that any namespace accessible to the environment hub may be utilized. When an object is added to the ephemeral organization, the organization provides the object with access to the global namespace.

Packages may be tested against the organization shapes of existing customers. Packages may be tested against multiple organization shapes before publishing them for release. For example, if a user's existing organization has a feature turned off, and an application being tested interacts with the feature, two ephemeral organization may be created, one with the feature turned on, and another with the feature turned off. For example, consider the situation in which an existing organization may have a Chatter feature (a logic module implementing chatter interactions) turned off, but the application relies on interactions with Chatter. Two ephemeral organizations may be created, one with Chatter turned on (the default) and one with Chatter turned off.

In some embodiments, the ephemeral organization's lifecycle may be managed through a command line interface (CLI) provided through a connected app and/or an environment hub. In one embodiment, order to manage ephemeral organizations from a CLI, a workspace may be configured with OAuth authentication to connect to the environment hub. Once configured, command line controls may be executed to create a new ephemeral organization. This enables a headless workflow model of interaction with the ephemeral organization. In one embodiment, tools provided through the CLI can be provided as a service. Various embodiments for use of a CLI are described in U.S. patent application Ser. No. 15/466,752, entitled "Techniques and Architectures for Providing a Command Line Interface Functionality as a Web Service," filed Mar. 22, 2017 by Christopher Wall, the contents of which are incorporated by references herein.

In some embodiments, ephemeral organizations may be created with certain optimizations for operations as a result of being created from an external source. The optimizations may speed up operations source as loading the source objects and data. One optimization is a determination that the ephemeral organization does not comprise sensitive data (e.g., data protected by a determined access level), and thus may execute a reduced dependency check as compared with a standard organization.

In some embodiments, ephemeral organizations can be created utilizing an environment hub (or similar resource). An environment hub allows developers/testers to view, connect, create and/or log in to multiple organizations from one location. In one embodiment, ephemeral organizations are associated with the environment hub. The environment hub can be used to store, among other things, metadata and configuration settings associated with existing (standard) organizations. To enable compartmentalization and security, access to the environment hub may be restricted. In some instances, a user may need to be associated with an account on the environment hub in order to create an ephemeral organization.

Figure 2:
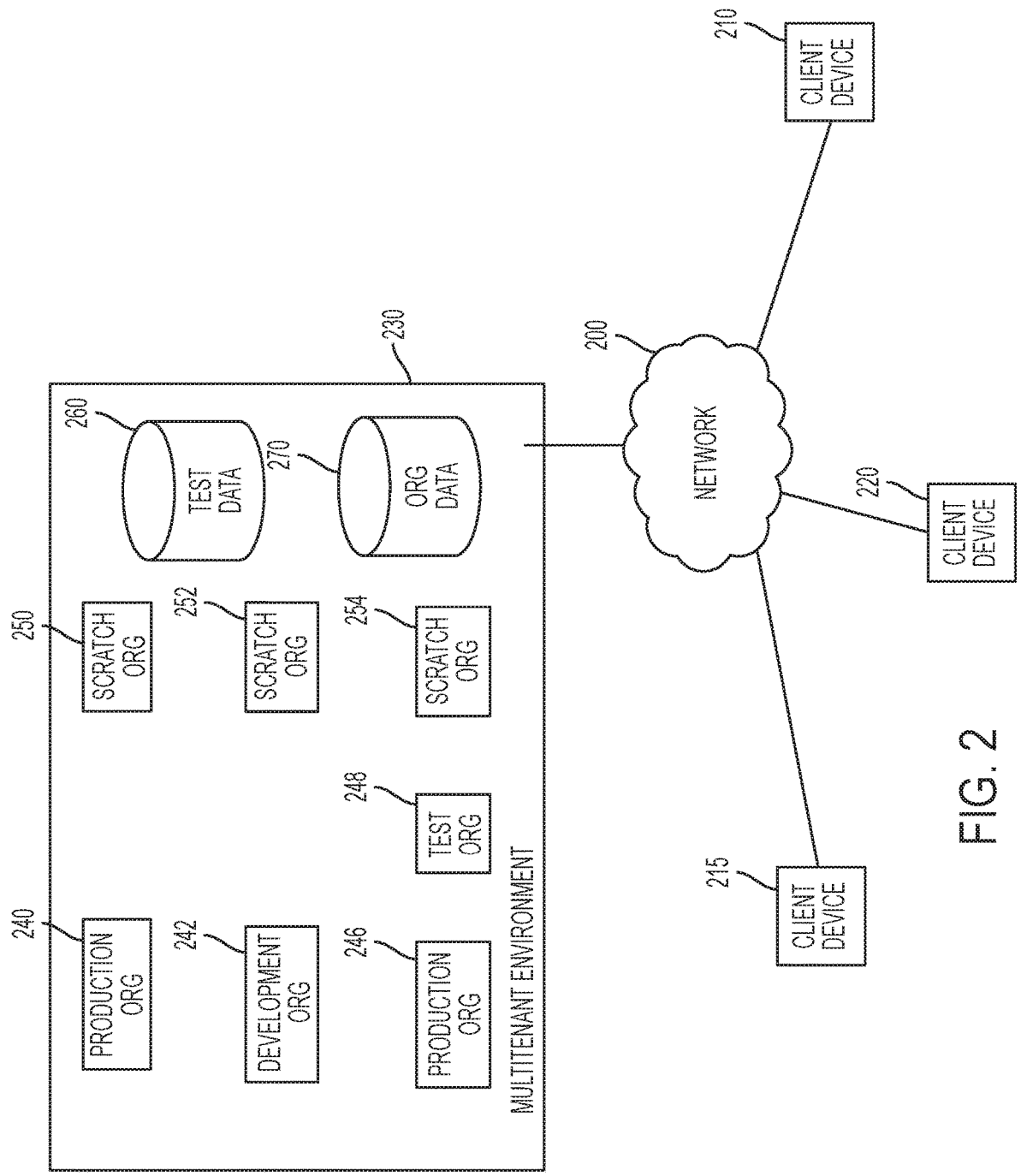
FIG. 2 is a conceptual illustration of a multitenant environment in which ephemeral (scratch) organizations can be utilized.

FIG. 2 is a conceptual illustration of a multitenant environment in which ephemeral (scratch) organizations can be utilized. In the example of FIG. 2, multitenant environment 230 can host any number of organizations (also referred to as "tenants"). A single customer of the multitenant environment provider can have multiple organizations. These organizations can be different types of organizations having different purposes.

In the example of FIG. 2, any number of client devices (e.g., 210, 215, 220) communicate with multitenant environment 230 through network 200. The client devices can be any type of electronic device capable of communicating over a network, for example, a laptop computer, a desktop computer, a tablet, a smartphone, a wearable computing device, a vehicle, a kiosk. Network 200 can be any type of wired and/or wireless network that allows electronic devices to communicate, for example, the Internet, a local area network, a personal area network, or any combination thereof.

As discussed above, any number of organizations can be supported within multitenant environment 230. These organizations can include production organizations (e.g., 240, 246), development organizations (e.g., 242) and test organization (e.g., 248). In general, a production org is one in which users operate on data belonging to the customer (e.g., org data 270). A development organization is one in which developers can develop, extend and/or integrate functionality without affecting a production environment. A test organization can be used for testing functionality before it is deployed to a production environment.

As discussed above, multitenant environment 230 can have one or more ephemeral scratch organizations (e.g., 250, 252, 254) that can be created and used for testing as described herein. When the scratch orgs are created, they are empty (i.e., they include no usable data) and can be populated with test data (e.g., test data 260) prior to testing.

In a multi-tenant model, each tenant is assigned a unique configuration and options that create an "organization shape." Aspects of the shape are determined by options under control of customers, but other aspects are derived from flags and licenses only the environment provider (e.g., Salesforce.com) has permission to configure. This may be for developing applications that are to be distributed to different tenants, which are configured to specifically account for different organization shapes. For example, if a tenant has multi-currency turned on, the data available to an application is different than for a tenant with multi-currency turned off. Some implementations (e.g., Apex) generate errors if not coded to properly process these variations.

Thus, as scratch orgs are created they have a shape that is determined by these options and characteristics. The shape can be controlled and to provide different scratch org shapes for efficient testing under different sets of conditions and configurations.

Because the logic adjusts to different organization shapes and the logic is tested against various organization shapes. Current techniques involve creation of multiple test organizations (e.g., 248), which are complicated to configure and create, and a limited and poorly-scaled resource.

As described herein, scratch organizations (e.g., 250, 252, 254) are created and operated differently than conventional test organizations. Standard test organizations are created provisioned from licensing/configuration systems that enable multi-tenancy operation. Scratch organizations have some features in common with conventional organizations, but are more flexible and include features not available to conventional organizations. In some embodiments, a scratch organization cannot be converted into a conventional organization or vice versa.

In one embodiment, scratch organizations may be created and provisioned by cloning configuration data of a conventional (e.g., production) organization. However, no link is created between the two organizations. Once created, changes to the scratch organization are not reflected back into the conventional organization. Similarly, changes to the conventional organization are not carried through to the corresponding ephemeral organization(s) after creation.

In some embodiments, the scratch orgs are created without user data (e.g., the orgs are empty at creation) and at conclusion of a test procedure the scratch orgs are discarded. Data used for testing can be synthetic data that is loaded from a data source (e.g., test data 260) after creation of the scratch org prior to running the test procedures. This allows testing conditions to be consistent and repeatable, which is difficult to do when organizations are maintained and cleaned for testing.

In some embodiments, scratch organizations may utilize scripts or an ephemeral organization launcher to load (read in and configure) synthetic data. Scratch organizations may not be configured to enable loading of customer data (i.e. sandbox) nor to retain data created directly in the organization.

By creating the scratch org from the same configuration file each time with no data included a consistent testing environment can be provided. In one embodiment, a data loader is utilized to load synthetic data into the empty scratch org for testing. In one embodiment, all definitions are external to the scratch org so that testing and processing is repeatable. Loading the same data each time provides testing consistency.

In one embodiment, once the testing has been completed the scratch org is discarded. There is no data cleaning or restoration. Further, there is no disaster recovery or failover mechanisms are necessary. In contrast to creation of ephemeral organizations as described herein, traditional cloning or sandboxing techniques can result in a changing organization shape because the cloning process replicates changes to the base organization.

Developed logic may be tested in the scratch orgs before being released to production environments. Additional organizations with different organizations shapes may be added to testing suites based on learned results. Organization shape changing is typically not allowed in production and sandbox environments.

When a test is executed, results of the test are collected. Example test results from operating ephemeral organizations include elapsed test time, processor test time, database utilization time, heap space, count of database round trips, limits, and warning messages. Other and/or different test parameters can also be utilized.

In one embodiment, the scratch org can be considered a unit of virtualization. In these embodiments, the scratch org can run on any suitable computing platform (e.g., production environment, remote cloud service, local computers, mobile devices). In one embodiment, the location of the scratch org is transparent to the testing entity and is not tied to any device or location.

In one embodiment, ephemeral organizations may be created with a global namespace if the user is either developing a managed package or unmanaged metadata. In one embodiment, ephemeral organizations are created with a reference to an environment hub so that any namespace accessible to the environment hub may be utilized. When an object is added to the ephemeral organization, the organization provides the object with access to the global namespace.

Packages may be tested against the organization shapes of existing customers. Packages may be tested against multiple organization shapes before publishing them for release. For example, if a user's existing organization has a feature turned off, and an application being tested interacts with the feature, two ephemeral organization may be created, one with the feature turned on, and another with the feature turned off. For example, consider the situation in which an existing organization may have a Chatter feature (a logic module implementing chatter interactions) turned off, but the application relies on interactions with Chatter. Two ephemeral organizations may be created, one with Chatter turned on (the default) and one with Chatter turned off.

In some embodiments, the ephemeral organization's lifecycle may be managed through a command line interface (CLI) provided through a connected app and/or an environment hub. In one embodiment, order to manage ephemeral organizations from a CLI, a workspace may be configured with OAuth authentication to connect to the environment hub. Once configured, command line controls may be executed to create a new ephemeral organization. This enables a headless workflow model of interaction with the ephemeral organization. In one embodiment, tools provided through the CLI can be provided as a service. Various embodiments for use of a CLI are described in U.S. patent application Ser. No. 15/466,752, entitled "Techniques and Architectures for Providing a Command Line Interface Functionality as a Web Service," filed Mar. 22, 2017 by Christopher Wall, the contents of which are incorporated by references herein.

In some embodiments, ephemeral organizations may be created with certain optimizations for operations as a result of being created from an external source. The optimizations may speed up operations source as loading the source objects and data. One optimization is a determination that the ephemeral organization does not comprise sensitive data (e.g., data protected by a determined access level), and thus may execute a reduced dependency check as compared with a standard organization.

In some embodiments, ephemeral organizations can be created utilizing an environment hub (or similar resource). An environment hub allows developers/testers to view, connect, create and/or log in to multiple organizations from one location. In one embodiment, ephemeral organizations are associated with the environment hub. The environment hub can be used to store, among other things, metadata and configuration settings associated with existing (standard) organizations. To enable compartmentalization and security, access to the environment hub may be restricted. In some instances, a user may need to be associated with an account on the environment hub in order to create an ephemeral organization.

Figure 3:
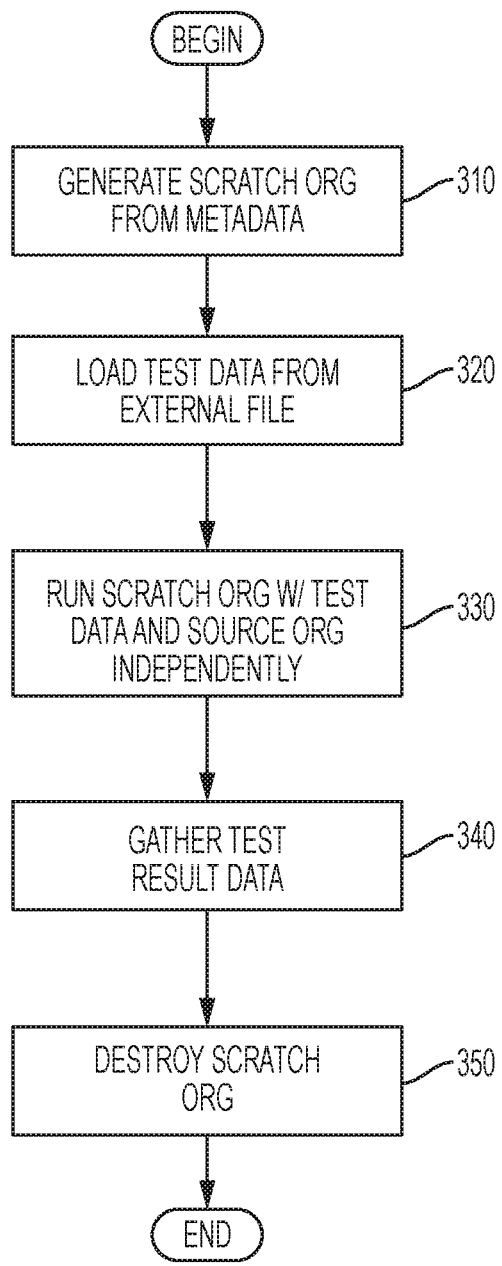
FIG. 3 is a flow diagram of one embodiment of utilization of an ephemeral organization.

FIG. 3 is a flow diagram of one embodiment of utilization of an ephemeral organization. The functionality described with respect to FIG. 3 can be provided, for example, by an on-demand services environment, examples of which are described below.

A scratch (ephemeral) organization is created utilizing metadata and/or other types of information, 310. Creation of the scratch org is described in greater detail above. The metadata utilized to create the scratch org can correspond to another organization within a multitenant environment. The metadata can be a copy of the metadata for a target organization in a current state, for example, or for some time in the past. As another example the metadata used to create the scratch org can be independent from any existing organization within the multitenant environment.

In one embodiment, test data can be loaded from an external file, 320. As discussed above, the scratch org is crated without user/operational data. That is, the scratch org is functionally empty at creation. For example, if the scratch org is a clone of an existing org, the scratch org does not contain the user data of the cloned org. This supports more efficient and more consistent test conditions.

The scratch org can then be run utilizing the loaded test data, 330. Running of the scratch org can be controlled to accomplish various testing goals. During the time that the scratch org is running, changes in the scratch org are not carried over to the source org (if any). Similarly, changes in the source org (if any) are not carried over to the scratch org. Further, if multiple scratch orgs are created and are running contemporaneously, changes from one scratch org are not carried over to another scratch org.

Test data is gathered from the running of the scratch org with the test data, 340. Any type of test data, for example, results of operations on the test data, resource utilization, operational conflicts, benchmark results, can be gathered and utilized. The scratch org is then destroyed, 350. If additional testing is desired, one or more additional scratch orgs can be created for the additional testing.

Figure 4:
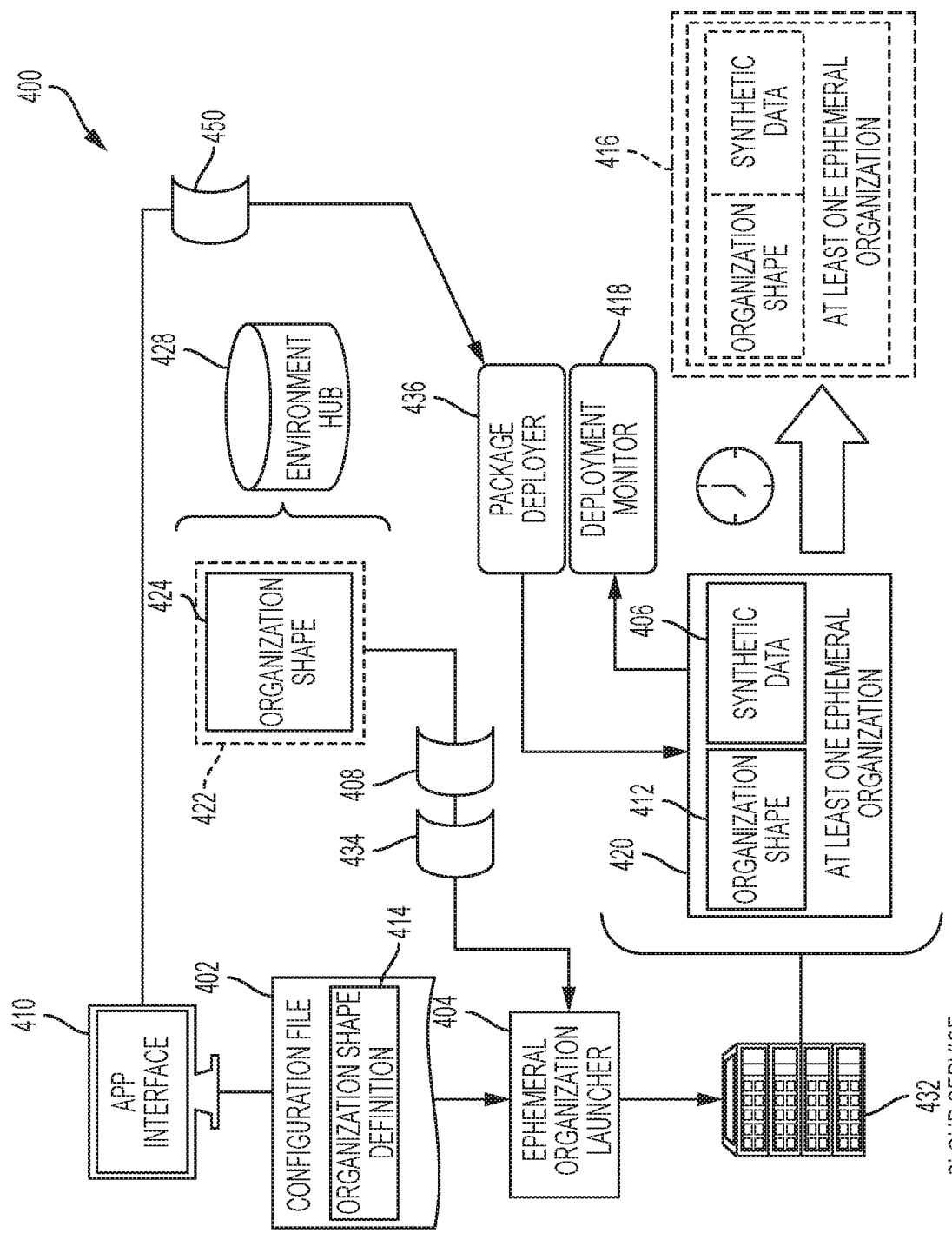
FIG. 4 illustrates an embodiment of system that can provide and manage one or more ephemeral organizations.

FIG. 4 illustrates an embodiment of system that can provide and manage one or more ephemeral organizations. In one embodiment, system 400 includes application interface 410, environment hub 428, ephemeral organization launcher 404, cloud service 432, package deployer 436 and deployment monitor 418. In alternate embodiments, system 400 can be provided without environment hub 428 and figuration information can come from another source. Various alternatives are discussed in greater detail below.

In one embodiment, application interface 410 includes (or is a mechanism to provide) test package 450 and/or configuration file 402 having at least organization shape definition 414. In one embodiment, environment hub 428 includes existing organization 422 having organization shape 424. In one embodiment, ephemeral organization launcher 404 includes object data 434 and metadata 408 from existing organization 422.

In one embodiment, cloud service 432 includes at least one ephemeral organization 420, each having organization shape 412 and synthetic data 406. In one embodiment, cloud service 432 additionally removes ephemeral organization 420 as expired ephemeral organization 416 following result submission to the test runner or following a time limit.

In one embodiment, ephemeral organization launcher 404 receives configuration file 402 having organization shape definition 414 from application interface 410. Ephemeral organization launcher 404 also receives object data 434 and metadata 408 of existing organization 422 from environment hub 428. In one embodiment, ephemeral organization launcher 404 is configured to communicate with the cloud service 432 to generate at least one ephemeral organization 420 from organization shape definition 414, object data 434, and metadata 408. In one embodiment, deployment monitor 418 operates to monitor at least some aspects of the operation of ephemeral organization 416. In one embodiment, package deployer 436 receives test package 450 from application interface 410. In one embodiment, package deployer 436 applies test package 450 to at least one ephemeral organization 420. At least one ephemeral organization 420 is deleted as an expired ephemeral organization 416 following a predetermined limit.

In one embodiment, ephemeral organization(s) 416 do not run in a production environment within cloud service 432. In one embodiment, ephemeral organization(s) 416 run within a test environment or a development environment within cloud service 432.

Figure 5:
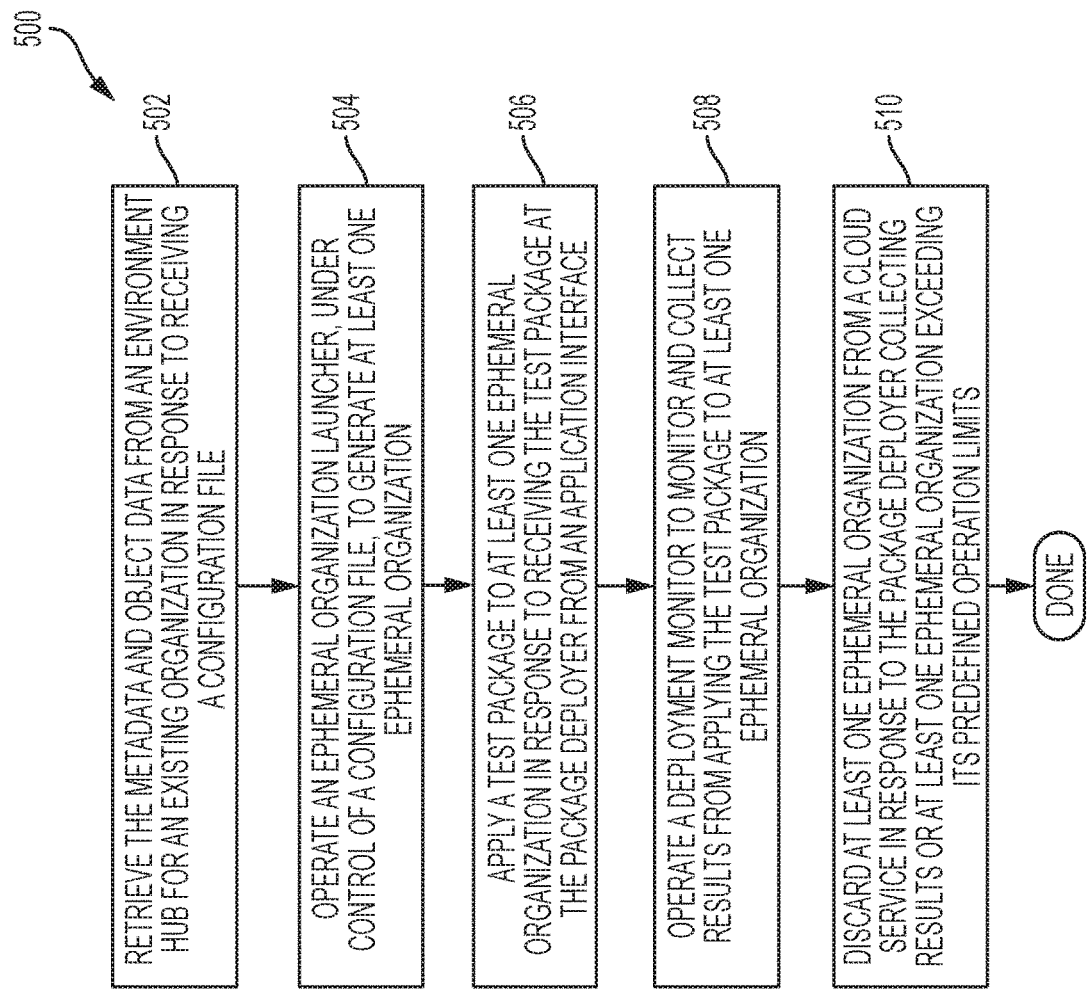
FIG. 5 is a flow diagram for one embodiment of a process for generating ephemeral organizations.

FIG. 5 is a flow diagram for one embodiment of a process for generating ephemeral organizations. In one embodiment, process 500 for development and testing phases retrieves metadata and object data from environment hub (or other source) for an existing organization in response to receiving a configuration file (block 502). In one embodiment, an ephemeral organization launcher is operated under control of the configuration file, to generate at least one ephemeral organization (block 504).

In one embodiment, a test package is applied to at least one ephemeral organization in response to receiving the test package at the package deployer from the application interface (block 506). The package deployer is operated to monitor and collect results from applying the test package to at least one ephemeral organization (block 508). In one embodiment, at least one ephemeral organization is discarded from the cloud service in response to the package deployer collecting results or at least one ephemeral organization exceeding predefined operation limits (block 510).

Figure 6:
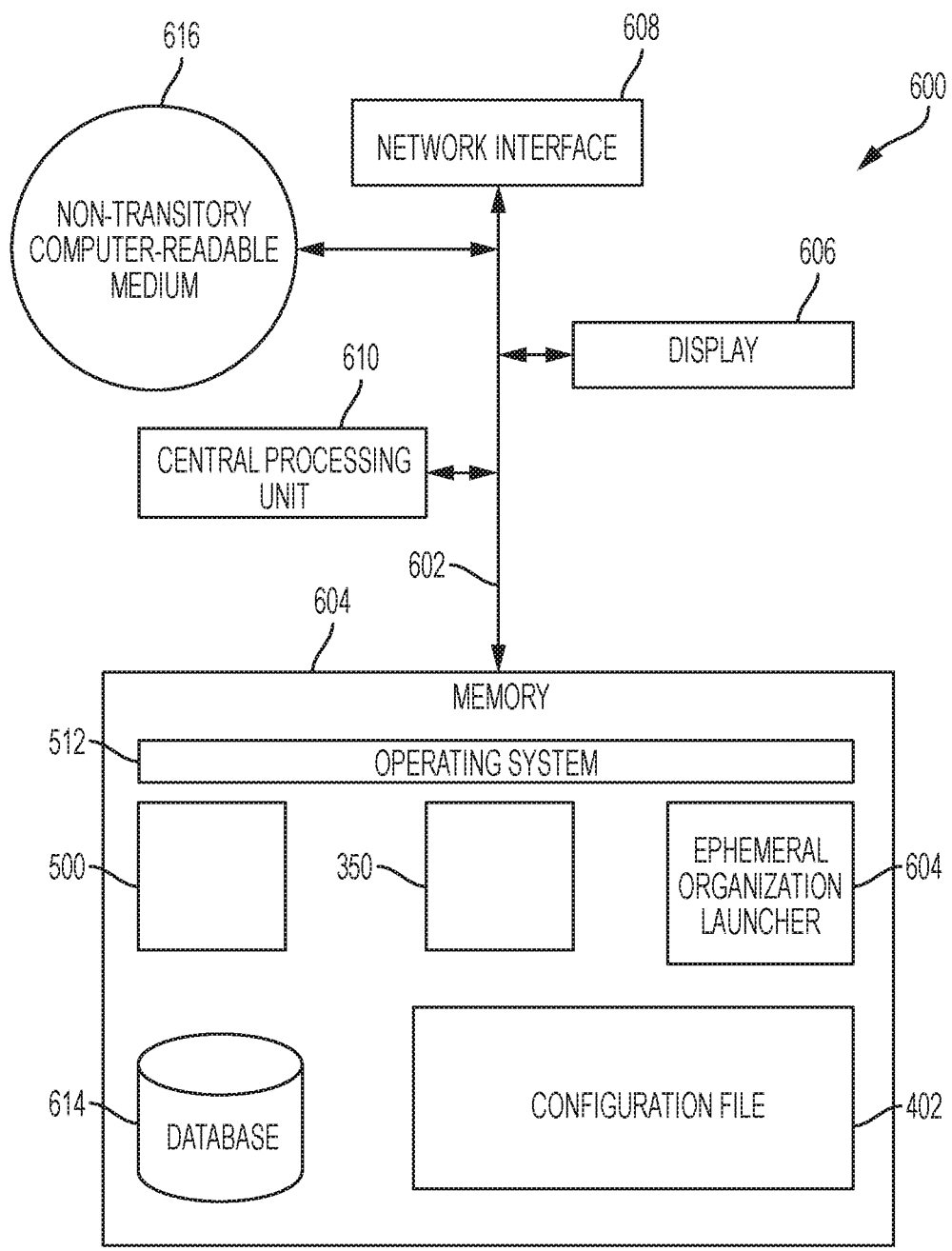
FIG. 6 is one embodiment of several components of an exemplary computer system.

FIG. 6 is one embodiment of several components of an exemplary computer system. In various embodiments, computer system 600 may include a desktop computer, server, workstation, mobile phone, laptop, tablet, set-top box, appliance, wearable computing device or other computing device that is capable of performing operations such as those described herein. In some embodiments, computer system 600 may include many more components than those shown in FIG. 6. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, computer system 600 may comprise one or more physical and/or logical devices that collectively provide the functionalities described herein. In some embodiments, computer system 600 may comprise one or more replicated and/or distributed physical or logical devices.

In some embodiments, computer system 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Computer system 600 includes a bus 602 interconnecting several components including a network interface 608, a display 606, a central processing unit 610, and a memory 604. Memory 604 generally comprises a random access memory ("RAM") and permanent non-transitory mass storage device, such as a hard disk drive or solid-state drive. Memory 604 stores an operating system 612.

These and other software components may be loaded into memory 604 of computer system 600 using a drive mechanism (not shown) associated with a non-transitory computer-readable medium 616, such as a floppy disc, tape, DVD/CD-ROM drive, memory card, or the like. Memory 604 also includes database 614. In some embodiments, computer system 600 may communicate with database 614 via network interface 608, a storage area network ("SAN"), a high-speed serial bus, and/or via the other suitable communication technology.

In some embodiments, database 614 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 7:
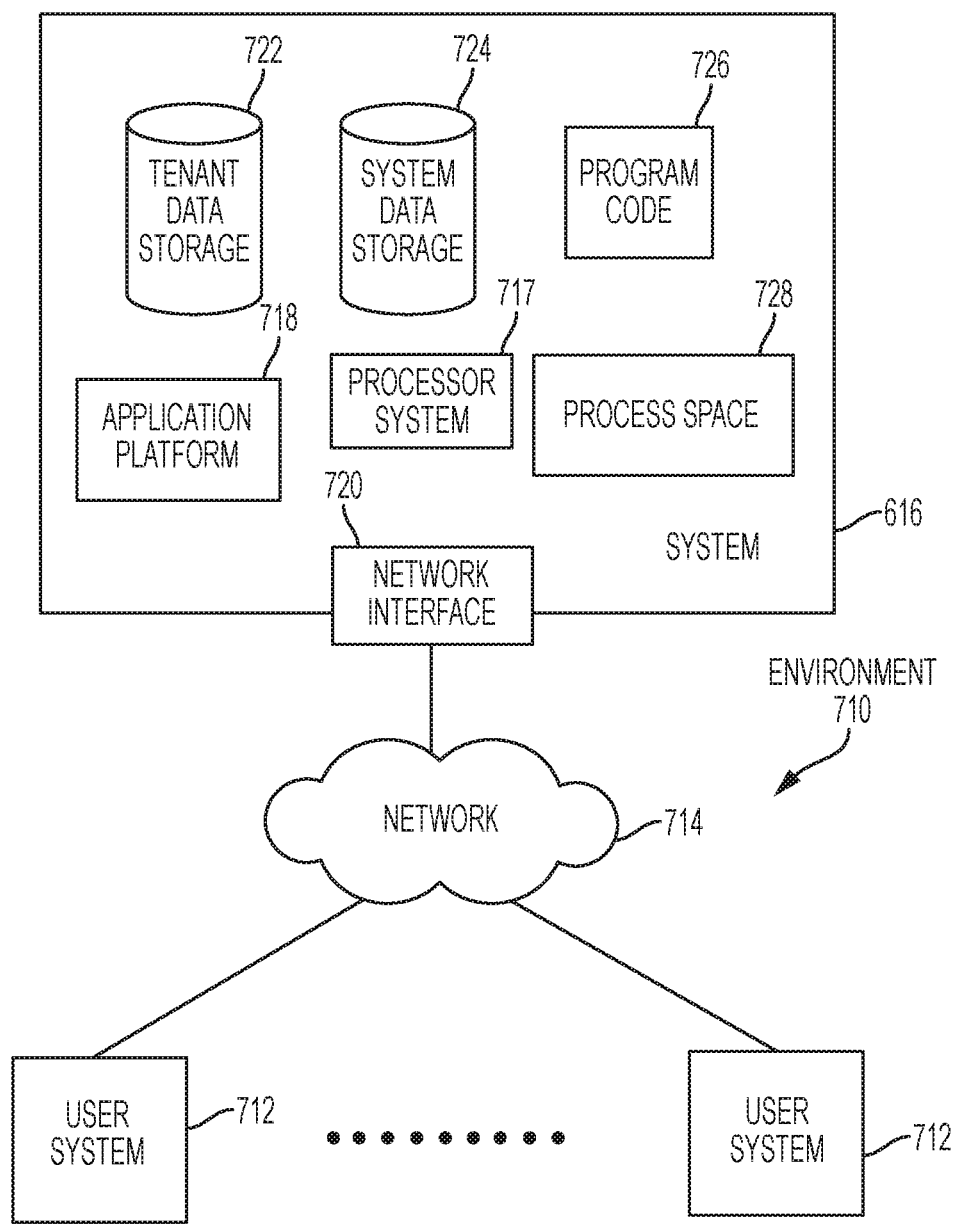
FIG. 7 is one embodiment of a block diagram of an environment where an on-demand database service might be used.

FIG. 7 illustrates a block diagram of an environment 710 wherein an on-demand database service might be used.

Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in herein FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Core series processor or the like. Similarly, system 716 (and additional instances of an MTS, where more than one is present) and all of their components might be operator configurable using application(s) including computer code to run using a central processing unit such as processor system 717, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
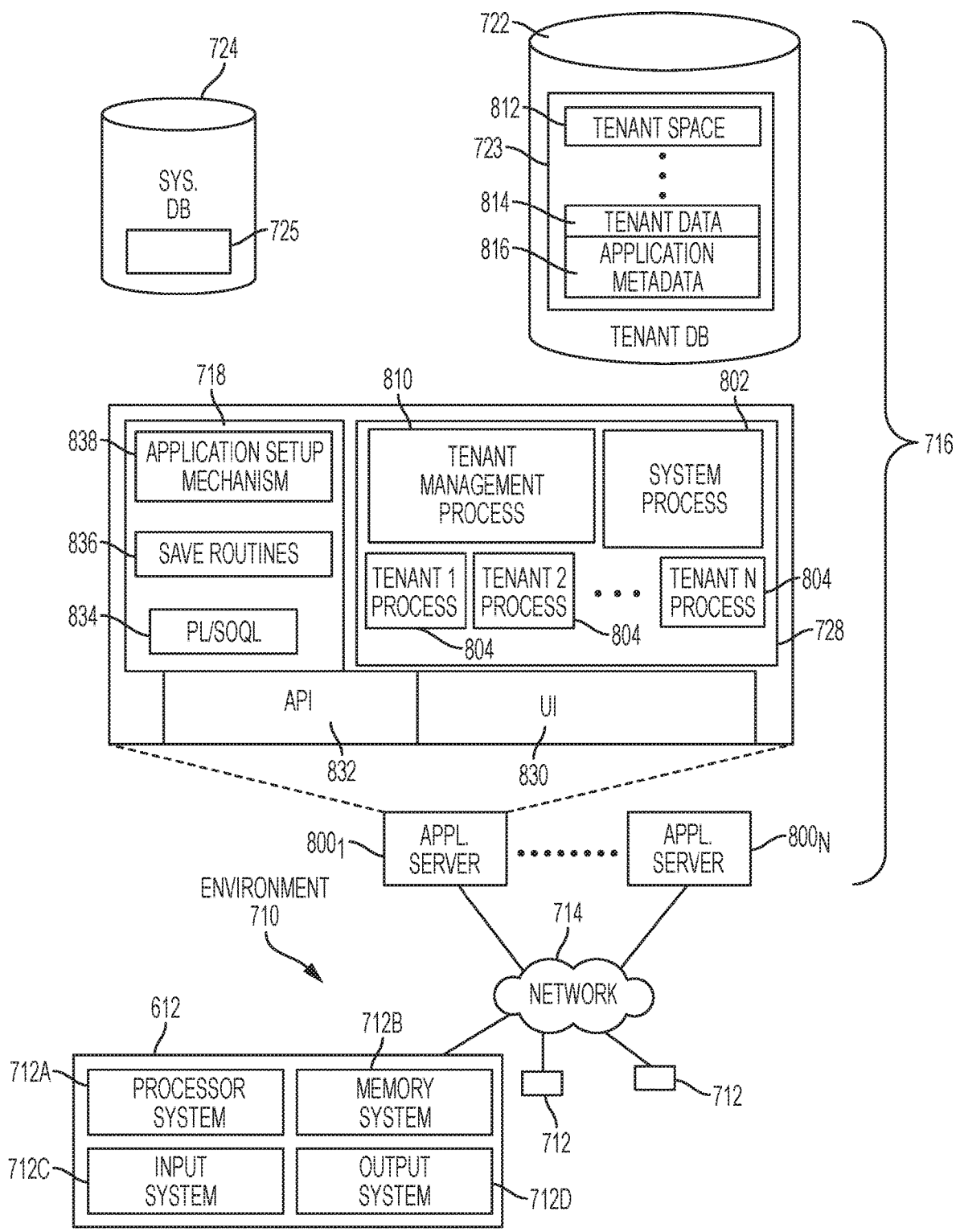
FIG. 8 is one embodiment of a block diagram of an environment where an on-demand database service might be used.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 BIG-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising: a plurality of hardware processing devices coupled with one or more memory devices, the plurality of hardware processing devices to provide a multitenant environment in which each tenant includes a group of users who share a common access with specific privileges to a resource instance, wherein a selected tenant includes one or more organizations that have corresponding subsets of specific privileges to the resource instance, the plurality of hardware processing devices configurable to:

generate a scratch organization without user data, the scratch organization defined by metadata indicating permissions, resource allocations, and licensing authorizations for the scratch organization without further provisioning, wherein the scratch organization is an ephemeral tenant within the multitenant environment, is only used for development tasks, and is to run in an isolated fashion within the multitenant environment when being used for the development tasks, and further wherein the multitenant environment hosts at least one non-ephemeral organization each of which undergoes at least one provisioning operation after creation and before operation;

load test data for the set of development tasks from a test source into the scratch organization, wherein changes to the non-ephemeral organizations are not applied to the scratch organization after creation of the scratch organization and changes to the scratch organization are not applied to the non-ephemeral organizations and the development tasks are defined by structures external to the scratch organization;

perform the set of development tasks using the loaded test data to generate test results;

destroy the scratch organization after the set of development tasks have been performed so that the scratch organization is used only for the set of development tasks with the loaded test data and the scratch organization is destroyed when the set of development tasks is completed.

2. The system of claim 1, wherein the scratch organization is an ephemeral organization that contains no user data and no test data at creation.

3. The system of claim 1 wherein the test data comprises synthetic data for testing.

4. The system of claim 1 wherein the selected tenant comprises multiple scratch organizations having different scopes, wherein at least one of the multiple scratch organizations has a first set of privileges that is a subset of the set of privileges and at least one of the multiple scratch organizations has a second set of privileges that is not a subset of the set of privileges.

5. The system of claim 1 wherein the set of metadata comprises metadata corresponding to one or more of tenant specific data, user management, tenant-specific functionality, configuration, customizations, non-functional properties, associated applications to define a shape of the corresponding organization.

6. A method implemented by a plurality of hardware processing devices coupled with one or more memory devices, the plurality of hardware processing devices to provide a multitenant environment in which each tenant includes a group of users who share a common access with specific privileges to a resource instance, wherein a selected tenant includes multiple organizations that have a corresponding subset of specific privileges to the resource instance, the method comprising:

generating a scratch organization without user data, the scratch organization defined by metadata indicating permissions, resource allocations, and licensing authorizations for the scratch organization without further provisioning, wherein the scratch organization is an ephemeral tenant within the multitenant environment, is only used for development tasks, and is to run in an isolated fashion within the multitenant environment when being used for the development tasks and further wherein the multitenant environment hosts at least one non-ephemeral organization each of which undergoes at least one provisioning operation after creation and before operation;

loading test data for the set of development tasks from a test source into the scratch organization, wherein changes to the non-ephemeral organizations are not applied to the scratch organization after creation of the scratch organization and changes to the scratch organization are not applied to non-ephemeral organizations and the development tasks are defined by structures external to the scratch organization;

performing the set of development tasks using the loaded test data to generate test results;

destroying the scratch organization after the set of development tasks have been performed so that the scratch organization is used only for the set of development tasks with the loaded test data and the scratch organization is destroyed when the set of development tasks is completed.

7. The method of claim 6, wherein the scratch organization is an ephemeral organization that contains no user data and no test data at creation.

8. The method of claim 6 wherein the test data comprises synthetic data for testing.

9. The method of claim 6 wherein the selected tenant comprises multiple scratch organizations having different scopes, wherein at least one of the multiple scratch organizations has a first set of privileges that is a subset of the set of privileges and at least one of the multiple scratch organizations has a second set of privileges that is not a subset of the set of privileges.

10. The method of claim 6 wherein the set of metadata comprises metadata corresponding to one or more of tenant specific data, user management, tenant-specific functionality, configuration, customizations, non-functional properties, associated applications to define a shape of the corresponding organization.

11. A non-transitory computer-readable medium having stored thereon instructions that, when executed by a plurality of hardware processing devices coupled with one or more memory devices, are configurable to provide a multitenant environment in which each tenant includes a group of users who share a common access with specific privileges to a resource instance, wherein a selected tenant includes multiple organizations that have a corresponding subset of specific privileges to the resource instance, the instructions to cause the plurality of hardware processing devices to:

generate a scratch organization without user data, the scratch organization defined by metadata indicating permissions, resource allocations, and licensing authorizations for the scratch organization without further provisioning, wherein the scratch organization is an ephemeral tenant within the multitenant environment, is only used for development tasks, and is to run in an isolated fashion within the multitenant environment when being used for the development tasks, and further wherein the multitenant environment hosts at least one non-ephemeral organization each of which undergoes at least one provisioning operation after creation and before operation;

load test data for the set of development tasks from a test source into the scratch organization, wherein changes to the non-ephemeral organizations are not applied to the scratch organization after creation of the scratch organization and changes to the scratch organization are not applied to the non-ephemeral organizations and the development tasks are defined by structures external to the scratch organization;

perform the set of development tasks using the loaded test data to generate test results;

destroy the scratch organization after the set of development tasks have been performed so that the scratch organization is used only for the set of development tasks with the loaded test data and the scratch organization is destroyed when the set of development tasks is completed.

12. The non-transitory computer-readable medium of claim 11 wherein the data comprises synthetic data for testing.

13. The non-transitory computer-readable medium of claim 11 wherein the selected tenant comprises multiple scratch organizations having different scopes, wherein at least one of the multiple scratch organizations has a first set of privileges that is a subset of the set of privileges and at least one of the multiple scratch organizations has a second set of privileges that is not a subset of the set of privileges.

14. The non-transitory computer-readable medium of claim 11 wherein the set of metadata comprises metadata corresponding to one or more of tenant specific data, user management, tenant-specific functionality, configuration, customizations, non-functional properties, associated applications to define a shape of the corresponding organization.

* * * * *